United States Patent
Ota et al.

(10) Patent No.: US 10,991,477 B2
(45) Date of Patent: Apr. 27, 2021

(54) INSULATED ELECTRICAL CABLE

(71) Applicants: SUMITOMO ELECTRIC INDUSTRIES, LTD., Osaka (JP); SUMITOMO ELECTRIC WINTEC, INC., Shiga (JP)

(72) Inventors: Shinya Ota, Osaka (JP); Masaaki Yamauchi, Osaka (JP); Hideaki Saito, Osaka (JP); Shuhei Maeda, Osaka (JP); Yasushi Tamura, Shiga (JP); Kengo Yoshida, Shiga (JP)

(73) Assignees: SUMITOMO ELECTRIC INDUSTRIES, LTD., Osaka (JP); SUMITOMO ELECTRIC WINTEC, INC., Shiga (JP)

( * ) Notice: Subject to any disclaimer, the term of this patent is extended or adjusted under 35 U.S.C. 154(b) by 0 days.

(21) Appl. No.: 16/604,265

(22) PCT Filed: Apr. 26, 2018

(86) PCT No.: PCT/JP2018/016928
§ 371 (c)(1),
(2) Date: Oct. 10, 2019

(87) PCT Pub. No.: WO2018/199211
PCT Pub. Date: Nov. 1, 2018

(65) Prior Publication Data
US 2020/0152348 A1 May 14, 2020

(30) Foreign Application Priority Data

Apr. 28, 2017 (JP) .............................. JP2017-089854

(51) Int. Cl.
*H01B 3/30* (2006.01)
*C09D 179/08* (2006.01)
*H01B 3/00* (2006.01)

(52) U.S. Cl.
CPC ........... *H01B 3/306* (2013.01); *C09D 179/08* (2013.01); *H01B 3/006* (2013.01)

(58) Field of Classification Search
CPC .......... H01B 3/006; H01B 3/306; H01B 7/02; H01B 7/04; H01B 7/06; H01B 7/08; H01B 3/30; H01B 3/301; H01B 3/302; H01B 3/303; H01B 3/56
USPC ............. 174/110 R, 110 SR, 120 R, 120 SR, 174/121 R, 121 SR
See application file for complete search history.

(56) References Cited

U.S. PATENT DOCUMENTS

| 4,576,857 A * | 3/1986 | Gannett | C08G 73/1064 |
| | | | 156/53 |
| 2014/0054062 A1 | 2/2014 | Yoshida et al. | |
| 2015/0262732 A1* | 9/2015 | Oya | H02K 3/30 |
| | | | 310/195 |

FOREIGN PATENT DOCUMENTS

| JP | H08-077849 | 3/1996 |
| JP | 2007-270074 | 10/2007 |
| JP | 2010-108725 | 5/2010 |

(Continued)

*Primary Examiner* — William H. Mayo, III
(74) *Attorney, Agent, or Firm* — IPUSA, PLLC

(57) ABSTRACT

An insulated electrical cable includes: a conductor; and an insulating layer that is laminated on an outer peripheral surface of the conductor and includes a polyimide as a main component, wherein the insulating layer includes a plurality of pores, and wherein a porosity of the insulating layer is greater than or equal to 25% by volume and less than or equal to 60% by volume.

6 Claims, 1 Drawing Sheet

(56) References Cited

FOREIGN PATENT DOCUMENTS

| | | |
|---|---|---|
| JP | 2017-016862 | 1/2017 |
| WO | 2013/073397 | 5/2013 |
| WO | 2014/123122 | 8/2014 |

\* cited by examiner

INSULATED ELECTRICAL CABLE

TECHNICAL FIELD

The present disclosure relates to an insulated electrical cable. The present application is based on and claims priority to Japanese Patent Application No. 2017-089854, filed on Apr. 28, 2017, the entire contents of the Japanese Patent Application are hereby incorporated herein by reference.

BACKGROUND ART

Insulated electrical cables used as coil windings of electrical devices such as transformers generally have a structure in which an insulating layer is formed on the outer peripheral surface of a conductor, and from the viewpoint of excellent heat resistance, a material including polyimide as a main component is preferably used as the material of this insulating layer.

In particular, in a case where an insulated electrical cable using such a polyimide is used under a high-temperature and high-humidity environment, the film is deteriorated by hydrolysis of the polyimide and the film strength is lowered. Therefore, there is a possibility that a crack of the insulating layer occurs.

As a technique for suppressing an occurrence of a crack of an insulating layer as described above, a method is proposed by which an electrodeposition coating film of a block copolymer polyimide having a siloxane bond and an anionic group is formed by a suspension-type electrodeposition coating material and a polyamideimide coating film that covers the electrodeposition coating film is further formed to form a composite insulating layer. According to this method, it seems that, due to an excellent resistance to moist heat or the like, an insulating member in which a crack of an insulating layer does not easily occur is obtained (see Japanese Laid-open Patent Publication No. 2010-108725).

PRIOR ART DOCUMENT

Patent Document

[Patent Document 1] Japanese Laid-open Patent Publication No. 2010-108725

SUMMARY OF THE INVENTION

An insulated electrical cable according to one aspect of the present disclosure is an insulated electrical cable including: a conductor; and an insulating layer that is laminated on an outer peripheral surface of the conductor and includes a polyimide as a main component, wherein the insulating layer includes a plurality of pores, and wherein a porosity of the insulating layer is greater than or equal to 25% by volume and less than or equal to 60% by volume.

EMBODIMENT FOR CARRYING OUT THE INVENTION

Figure 1:
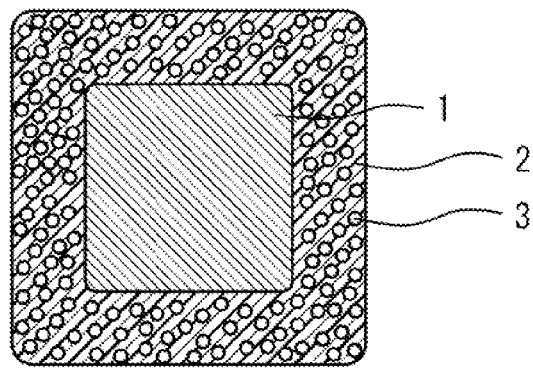
FIG. 1 is a schematic cross sectional view of an insulated electrical cable according to an embodiment of the present disclosure.

Problem to be Solved by the Present Disclosure

In a case where the above described conventional technique is used, a specific polyimide needs to be used and a plurality of layers need to be formed. Therefore, there is a disadvantage that the manufacturing process of an insulated electrical cable becomes extremely complicated. It is also required that, in particular, an insulated electrical cable has a low tensile stress at the time of extension and excellent flexibility so that the insulated electrical cable can be preferably used as a winding or the like.

In view of the above, the present disclosure has an object to provide an insulated electrical cable that can effectively suppress an occurrence of a crack of an insulating layer and that is excellent in flexibility.

Effect of the Present Disclosure

An insulated electrical cable according to the present disclosure effectively suppresses an occurrence of a crack of an insulating layer and is excellent in flexibility.

Description of Embodiment of the Present Disclosure

An insulated electrical cable according to one aspect of the present disclosure is an insulated electrical cable including: a conductor; and an insulating layer that is laminated on an outer peripheral surface of the conductor and includes a polyimide as a main component, wherein the insulating layer includes a plurality of pores, and wherein a porosity of the insulating layer is greater than or equal to 25% by volume and less than or equal to 60% by volume.

The insulated electrical cable includes pores in an insulating layer including polyimide as a main component, and the porosity of the insulating layer is within the above described range. Therefore, it is considered to be able to disperse and reduce stress generated by processing, and even in a case where it is used in a high-temperature and high-humidity environment or the like and the strength such as film extension is decreased due to hydrolysis of a polyimide, which is a main component, it is possible to effectively suppress a crack of an insulating layer. In addition, even if the insulating layer includes a polyimide as a main component, by setting the porosity within the above described range, the insulated electrical cable has excellent flexibility. Herein, "porosity" means a percentage of the volume of pores with respect to the volume containing the pores of an insulating layer.

It is preferable that a tensile stress at a time of 10% extension of the insulating layer is less than or equal to 100 MPa. In this way, the insulated electrical cable can be preferably used as a winding because the tensile stress at the time of 10% extension of the insulating layer can be in the above described range.

It is preferable that an average thickness of the insulating layer is greater than or equal to 10 μm. In this way, even when the thickness of the insulating layer is increased, the insulated electrical cable can effectively suppress an occurrence of a crack of the insulating layer and is excellent in flexibility.

It is preferable that the polyimide is a condensation polymer of an aromatic tetracarboxylic dianhydride and an aromatic diamine. According to the insulated electrical cable, even in a case of the above described polyimide that generally easily hydrolyses while having a high heat resistance, it is possible to effectively suppress a crack of the insulating layer and it is possible to provide an excellent flexibility.

It is desirable that a primer layer is further included between the conductor and the insulating layer. According to this configuration, adhesion between the conductor and the insulating layer can be enhanced, and as a result, the characteristics of the insulated electrical cable such as flexibility, wear resistance, scratch resistance, and workability can be effectively enhanced.

It is desirable that the insulating layer includes a plurality of pores and an outer shell at a peripheral portion of the pores. According to this configuration, a plurality of pores is prevented from communicating, and as a result, a crack of the insulating layer is suppressed and the flexibility of the insulating layer is further enhanced.

Details of Embodiment of the Present Disclosure

In the following, Hereinafter, an insulated electrical cable and a method of manufacturing an insulated electrical cable according to an embodiment of the present disclosure will be described with reference to the drawings.

[Insulated Electrical Cable]

FIG. 1 is a cross-sectional view illustrating the insulated electrical cable. The insulated electrical cable includes a conductor 1 and an insulating layer 2 that is laminated on the outer peripheral surface of the conductor 1. The insulating layer 2 includes a plurality of pores 3.

<Conductor>

Examples of the cross-sectional shape of the conductor 1 include a circle shape, an ellipse shape, a race track shape, a polygonal shape such as a hexagon shape, a triangle shape, a square shape, and a rectangle shape, and the like. Of these, the conductor 1 is preferably a square conductor with a square cross section and a flat conductor with a rectangular cross section. Also, the conductor 1 may be a stranded wire obtained by twisting a plurality of strands.

A material of the conductor 1 is preferably a metal having a high conductivity and a large mechanical strength. Examples of such a metal include copper, copper alloys, aluminum, nickel, silver, soft iron, steel, stainless steel, and the like. As the conductor 1, it is possible to use a material in which such a metal is linearly formed, or a multilayer structure in which such a linear material is further coated with another metal, such as a nickel-coated copper wire, a silver-coated copper wire, a copper-coated aluminum wire, or copper-coated steel wire, or the like.

A lower limit of an average cross sectional area of the conductor 1 is preferably 0.01 mm$^2$, and is more preferably 0.1 mm$^2$. On the other hand, an upper limit of the average cross sectional area of the conductor 1 is preferably 20 mm$^2$, and is more preferably 10 mm$^2$. When the average cross sectional area of the conductor 1 is less than the above described lower limit, the volume of the insulating layer 2 with respect to the conductor 1 becomes large, and a volumetric efficiency of a coil or the like formed using the insulated electrical cable may deteriorate. On the other hand, when the average cross sectional area of the conductor 1 exceeds the above described upper limit, the insulating layer 2 needs to be formed thick in order to secure a sufficient insulation property, and the diameter of the insulated electrical cable may become unnecessarily large.

<Insulating Layer>

The insulating layer 2 includes a plurality of pores 3, as illustrated in FIG. 1.

A lower limit of a porosity of the insulating layer 2 is 25% by volume, is preferably 30% by volume, and is more preferably 35% by volume. On the other hand, an upper limit of the porosity of the insulating layer 2 is 60% by volume, is preferably 55% by volume, and is more preferably 50% by volume. When the porosity of the insulating layer 2 is less than the above described lower limit, stress generated by hydrolysis in the insulating layer 2 cannot be sufficiently dispersed and reduced, and an occurrence of a crack cannot be sufficiently suppressed. Also, the flexibility of the insulating layer becomes insufficient. On the other hand, when the porosity of the insulating layer 2 exceeds the above described upper limit, because the mechanical strength of the insulating layer 2 decreases, an occurrence of a crack cannot be sufficiently suppressed. The porosity (% by volume) of the insulating layer 2 can be obtained from a formula $(W1-W2) \times 100/W1$, using a mass W1 of the insulating layer 2 in a case of no pores, which is obtained by multiplying a density $\rho 1$ of the material of the insulating layer 2 by an apparent volume V1 computed from an outline of the insulating layer 2, and an actual mass W2 of the insulating layer 2.

The pores 3 preferably have a high independent porosity. By increasing the independent porosity in the pores 3, the uniformity of the presence distribution of the pores 3 in the insulating layer 2 can be enhanced, and as a result, an occurrence of a crack of the insulating layer can be more effectively suppressed. In addition, the flexibility of the insulating layer is enhanced. Here, the "independent porosity" is, among the pores 3, when the insulating layer 2 is observed by a scanning electron microscope (SEM), a volume % of pores (independent pores) that are not open to each other via a resin composition having an insulation property between adjacent pores with respect to all pores.

A lower limit of a closed porosity in the pores 3 is preferably 25% by volume, is more preferably 60% by volume, and is more preferably 90% by volume. On the other hand, an upper limit of the closed porosity in the above described pores is 100% by volume, for example.

A lower limit of an average diameter of the pores 3 is preferably 0.1 µm, and is more preferably 1 µm. On the other hand, an upper limit of the above described average diameter of the pores 3 is preferably 10 µm, and is more preferably 8 µm. When the average diameter of the pores 3 is less than the above described lower limit, there is a possibility that stress generated in the insulating layer 2 cannot be sufficiently dispersed and reduced. On the other hand, when the average diameter of the pores 3 exceeds the above described upper limit, the uniformity of the presence distribution of the pores 3 decreases, and there is a possibility that generated stress cannot be sufficiently dispersed and reduced. Note that the average diameter of the pores 3 is a value obtained by measuring a cross section with a pore diameter distribution measuring device (for example, "Porous Material Automatic Pore Diameter Distribution Measuring System" manufactured by Porous Materials Inc.).

Figure 2:
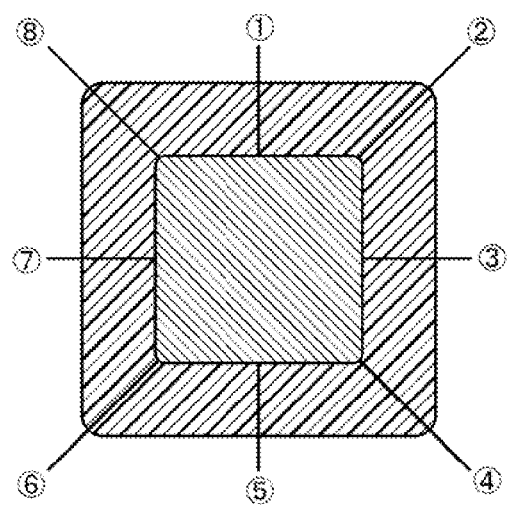
FIG. 2 is a diagram for explaining a method of measuring an average thickness of the insulated electrical cable according to the embodiment of the present disclosure.

A lower limit of an average thickness of the insulating layer 2 is preferably 1 µm, is more preferably 3 µm, is further preferably 5 µm, is particularly preferably 10 µm, is still more preferably 50 µm, and is most preferably 100 µm. On the other hand, an upper limit of the average thickness of the insulating layer 2 is preferably 200 µm, and is more preferably 180 µm. When the average thickness of the insulating layer 2 is less than the above described lower limit, a break is easily formed in the insulating layer 2, and the insulation of the conductor 1 may become insufficient. On the other hand, when the average thickness of the insulating layer 2 exceeds the above described upper limit, the volumetric efficiency of a coil or the like that is formed using the insulated electrical cable may deteriorate. Note that the average thickness of the insulating layer 2 is determined by measuring the thicknesses at eight points, which are indicated by enclosed alphanumerics in FIG. 2, in the cross-section of the obtained insulated electrical cable. For the measurement, a polarized light microscope BX51 manufactured by OLYMPUS corporation is used.

An upper limit of the tensile stress at the time of 10% extension of the insulating layer 2 is preferably 100 MPa, is more preferably 80 MPa, and is further more preferably 60 MPa. A lower limit of the above described tensile stress is, for example, 20 MPa. By setting the tensile stress of the insulating layer 2 at the time of 10% extension in the above described range, flexibility at the time of extension becomes excellent, and the insulated electric cable can be preferably used as a winding or the like. The tensile stress at the time of 10% extension of the insulating layer 2 is a value that is obtained as the tensile stress when the rate of extension is 10% based on a stress-strain curve obtained from a tensile test of the insulating layer 2.

The insulating layer 2 is formed of a resin composition including polyimide as a main component and pores 3 that are discretely present in the resin composition. The insulating layer 2 is formed by applying and printing a varnish on the outer peripheral surface of conductor 1, which will be described later. Here, the term "main component" means a component having the highest content, for example, which is a component contained by 50% by mass or more.

Although the polyimide is not particularly limited, a condensation polymer of a tetracarboxylic anhydride and a diamine is usually used as the polyimide. The polyimide can be formed, first, by condensation of a tetracarboxylic acid dihydrate with a diamine to obtain a polyamic acid that is a precursor of the polyimide, and then by dewatering cyclization by heating the polyamic acid.

Examples of the tetracarboxylic dianhydride include:

an aliphatic tetracarboxylic dianhydride such as 1,1,2,2-ethanetetracarboxylic dianhydride, 1,2,3,4-butanetetracarboxylic dianhydride, 1,2,3,4-cyclobutanetetracarboxylic dianhydride, or bicyclo [2.2.2] oct-7-ene-2,3,5,6-tetracarboxylic dianhydride; and an aromatic tetracarboxylic dianhydride such as pyromellitic dianhydride, 3,3',4,4'-biphenyltetracarboxylic dianhydride, bis (3,4-dicarboxyphenyl) ether dianhydride, 3,3',4,4'-benzophenonetetracarboxylic dianhydride, 2,2-bis (3,4-dicarboxyphenyl) hexafluoropropane dianhydride, or 3,3',4,4'-biphenylsulfone tetracarboxylic dianhydride.

As the tetracarboxylic dianhydride, from the viewpoint of further enhancing the heat resistance of the polyimide, an aromatic tetracarboxylic dianhydride is preferable, and pyromellitic dianhydride, 3,3',4,4'-biphenyltetracarboxylic dianhydride, bis (3,4-dicarboxyphenyl) ether dianhydride, 3,3',4,4'-benzophenone tetracarboxylic dianhydride, and 3,3',4,4'-biphenylsulfone tetracarboxylic dianhydride are preferable.

Examples of the diamine include:

an aliphatic diamine such as hexamethylenediamine, 1,2-diaminotetradecane, 1,2-diaminoheptadecane, 1,2-diaminooctadecane, 1,9-diaminononane, 2,2-dimethyl-1,3-propanediamine, or 1,11-diaminoundecane; and an aromatic diamine such as m-phenylenediamine, p-phenylenediamine, 2,4-diaminotoluene, 4,4'-diamino-3,3'-dimethyl-1,1'-biphenyl, 4,4'-diamino-3,3'-dihydroxy-1,1'-biphenyl, 3,4'-diaminodiphenyl ether, 4,4'-diaminodiphenyl ether, 3,3'-diaminodiphenyl sulfone, 4,4'-diaminodiphenyl sulfone, 4,4'-diaminodiphenyl sulfide, 2,2-bis (4-aminophenyl) propane, 2,2-bis (4-aminophenyl) hexafluoropropane, 1,3-bis (4-aminophenoxy) benzene, 1,4-bis (4-aminophenoxy) benzene, 4,4'-bis (4-aminophenoxy) biphenyl, 2,2-bis [4-(4-aminophenoxy) phenyl] propane, 2,2-bis [4-(4-aminophenoxy) phenyl] hexafluoropropane, bis [4-(3-aminophenoxy) phenyl] sulfone, bis [4-(4-aminophenoxy) phenyl] sulfone, 2,6-diaminopyridine, 2,6-diamino-4-methylpyridine, 4,4'-(9-fluorenylidene) dianiline, or α,α-bis (4-aminophenyl)-1,3-diisopropylbenzene.

As the diamine, from the viewpoint of further enhancing the heat resistance of the polyimide, an aromatic diamine is preferable, and 4,4'-diaminodiphenyl ether, bis [4-(3-aminophenoxy) phenyl] sulfone, and bis [4-(4-aminophenoxy) phenyl] sulfone are more preferable.

As the polyimide, from the viewpoint of further enhancing the heat resistance of the polyimide, a condensation polymer of an aromatic tetracarboxylic dianhydride and an aromatic diamine is preferable. According to the present disclosure, even in a case where a polyimide, which has such high heat resistance and is generally easily hydrolyzed, is used, an occurrence of a crack of the insulating layer can be effectively suppressed, and an excellent flexibility can be provided. One kind or two or more kinds can be used for each of tetracarboxylic anhydride and diamine. Also, one kind or two or more kinds of polyimide can be used.

The resin composition may contain, in addition to the polyimide that is the main component, a thermosetting resin such as, polyvinyl formal, thermosetting polyurethane, thermosetting acrylic, epoxy, thermosetting polyester, thermosetting polyester imide, thermosetting polyester amide imide, aromatic polyamide, or thermosetting polyamide imide, or a thermoplastic resin such as polyetherimide, polyphenylene ether, or polyethersulfone, for example.

Also, the resin composition forming the insulating layer 2 may contain a curing agent together with the resin described above. Examples of the curing agent include a titanium-based curing agent, an isocyanate-based compound, a blocked isocyanate, a urea, a melamine compound, an amino resin, an alicyclic acid anhydride such as methyltetrahydrophthalic anhydride, an aliphatic acid anhydride, and an aromatic acid anhydride. These curing agents are suitably selected in accordance with the type of resin contained in the resin composition to be used. For example, when a polyamideimide-based resin is used, imidazole, triethylamine, or the like is preferably used as a curing agent.

Note that examples of the titanium-based curing agent include tetrapropyl titanate, tetraisopropyl titanate, tetramethyl titanate, tetrabutyl titanate, and tetrahexyl titanate. Examples of the above described isocyanate-based compound include an aromatic diisocyanate such as tolylene diisocyanate (TDI), diphenylmethane diisocyanate (MDI), p-phenylene diisocyanate, or naphthalene diisocyanate, an aliphatic diisocyanate having 3 to 12 carbon atoms such as hexamethylene diisocyanate (HDI), 2,2,4-trimethylhexane diisocyanate, or lysine diisocyanate, an alicyclic isocyanate having 5 to 18 carbon atoms such as 1,4-cyclohexane diisocyanate (CDI), isophorone diisocyanate (IPDI), 4,4'-dicyclohexylmethane diisocyanate (hydrogenated MDI), methylcyclohexane diisocyanate, isopropylidene dicyclohexyl-4,4'-diisocyanate, 1,3-diisocyanatomethylcyclohexane (hydrogenated XDI), hydrogenated TDI, 2,5-bis (isocyanatomethyl)-bicyclo [2.2.1] heptane, or 2,6-bis (isocyanatomethyl)-bicyclo [2.2.1] heptane, an aliphatic diisocyanate having an aromatic ring such as xylylene diisocyanate (XDI) or tetramethylxylylene diisocyanate (TMXDI), and a modified substance thereof. Examples of the above described blocked isocyanate include a compound in which a blocking agent such as dimethylpyrazole is added to an isocyanate group such as diphenylmethane-4,4'-diisocyanate (MDI), diphenylmethane-3,3'-diisocyanate, diphenylmethane-3,4'-diisocyanate, diphenylether-4,4'-diisocyanate, benzophenone-4,4'-diisocyanate, diphenylsulfone-4,4'-diisocyanate, tolylene-2,4-diisocyanate, tolylene-2,6-diisocyanate, naphthylene-1,5-diisocyanate, m-xylylene diisocyanate, or p-xylylene diisocyanate. Examples of the melamine compound include methylated melamine, butylated melamine, methylolated melamine, and butyrololized melamine.

In an electrical device such as a motor or a transformer, the insulated electrical cable can be suitably used as a winding by being wound around a core or being inserted into a core after being cut and bent.

[Method of Manufacturing Insulated Electrical Cable]

Next, a method of manufacturing the insulated electrical cable will be described. The method of manufacturing the insulated electrical cable includes a process (varnish preparing process) of preparing a varnish by diluting a resin containing a polyimide that forms the insulating layer 2 and particles (thermally decomposable resin-containing particles) containing a thermally decomposable resin that thermally decomposes at a temperature lower than the baking temperature of the resin containing the polyimide; a process (varnish coating process) of coating the above described varnish on the outer peripheral surface of the conductor 1; and a process (heating process) of removing the thermally decomposable resin in the above described thermally decomposable resin-containing particles by heating.

<Varnish Preparing Process>

In the varnish preparing process described above, the varnish is prepared by diluting, with a solvent, the resin containing the polyimide that forms the insulating layer 2 and the thermally decomposable resin-containing particles.

The thermally decomposable resin contained in the thermally decomposable resin-containing particles described above is not particularly limited as long as it is a resin has a thermal decomposition temperature that is lower than the baking temperature of the resin that forms the insulating layer 2 described above. The baking temperature of the resin that forms the insulating layer 2 is suitably set according to the type of resin that contains polyimide, and is normally greater than or equal to approximately 200° C. and less than or equal to approximately 350° C. Accordingly, the lower limit of the thermal decomposition temperature of the above described thermally decomposable resin is preferably 200° C., and the upper limit is preferably 300° C. Here, the thermal decomposition temperature means a temperature at which the mass reduction rate becomes 50% when the temperature is increased from ambient temperature by 10° C./min in an air atmosphere. The thermal decomposition temperature can be obtained, for example, by measuring the thermogravimetry using a thermogravimetry-differential thermal analyzer ("TG/DTA" manufactured by SII Nano Technology Inc.).

Examples of the thermally decomposable resin described above include, but are not particularly limited to, a compound in which one end, both ends, or a part is alkylated, (meth) acrylated or epoxidized, such as polyethylene glycol or polypropylene glycol, an alkyl ester polymer, having 1 to 6 carbon atoms, of a (meth) acrylic acid, such as poly (meth) methyl acrylate, poly (meth) ethyl acrylate, poly (meth) propyl acrylate, or poly (meth) butyl acrylate, a polymer of a modified (meth) acrylate such as an urethane oligomer, an urethane polymer, an urethane (meth) acrylate, an epoxy (meth) acrylate, or a ε-caprolactone (meth) acrylate, a poly (meth) acrylic acid, a cross-linked product thereof, polystyrene, cross-linked polystyrene, and the like. Among these, a (meth) acrylic polymer or a crosslinked product thereof is preferable, and a poly (meth) acrylate or a crosslinked product thereof is more preferable. In addition, it is preferable that the above described thermally decomposable resin can be uniformly distributed in an island-like configuration of fine particles in a sea-like configuration of the resin that forms the insulating layer 2 in terms of being able to form independent pores. Therefore, the thermally decomposable resin described above is preferably a resin that is excellent in compatibility with the resin forming the insulating layer 2 and that can be shaped into a spherical shape, and is preferably a crosslinked resin, specifically.

A crosslinked poly (meth) acrylic polymer as described above can be obtained, for example, by polymerizing (meth) acrylic monomers and polyfunctional monomers by emulsion polymerization, suspension polymerization, solution polymerization, or the like.

Here, examples of as the (meth) acrylic monomers include acrylic acid, methyl acrylate, ethyl acrylate, n-butyl acrylate, isobutyl acrylate, t-butyl acrylate, dodecyl acrylate, stearyl acrylate, 2-ethylhexyl acrylate, tetrahydrofurfuryl acrylate, diethylaminoethyl acrylate, methacrylic acid, methyl methacrylate, ethyl methacrylate, propyl methacrylate, n-butyl methacrylate, isobutyl methacrylate, t-butyl methacrylate, n-octyl methacrylate, dodecyl methacrylate, 2-ethylhexyl methacrylate, stearyl methacrylate, diethylaminoethyl methacrylate, and the like.

Also, examples of the polyfunctional monomers include divinylbenzene, ethylene glycol di (meth) acrylate, trimethylolpropane triacrylate, and the like.

Note that as constituent monomers of a crosslinked poly (meth) acrylic polymer, other monomers may be used other than (meth) acrylic monomers and polyfunctional monomers. Examples of other monomers include glycol esters of (meth) acrylic acid such as ethylene glycol mono (meth) acrylate and polyethylene glycol mono (meth) acrylate, alkyl vinyl ethers such as methyl vinyl ether and ethyl vinyl ether, vinyl esters such as vinyl acetate and vinyl butyrate, N-alkyl-substituted (meth) acrylamides such as N-methylacrylamide, N-ethylacrylamide, N-methylmethacrylamide, and N-ethylmethacrylamide, nitriles such as acrylonitrile and methacrylonitrile, styrene-based monomers such as styrene, p-methylstyrene, p-chlorostyrene, chloromethylstyrene, and α-methylstyrene, and the like.

The thermally decomposable resin-containing particles described above are preferably spherical. A lower limit of an average particle diameter of the thermally decomposable resin-containing particles described above is preferably 0.1 μm, is more preferably 0.5 μm, and is further more preferably 1 μm. On the other hand, an upper limit of the average particle diameter of the thermally decomposable resin-containing particles described above is preferably 100 μm, is more preferably 50 μm, is further more preferably 30 μm, and is particularly preferably 10 μm. The above described thermally decomposable resin-containing particles form pores at portions where they were thermally decomposed at the time of baking the resin that forms the insulating layer 2. Therefore, when the average particle diameter of the above described thermally decomposable resin-containing particles is less than the above described lower limit, there is a possibility that it becomes difficult to form pores in the insulating layer 2. Conversely, when the average particle diameter of the above described thermally decomposable resin-containing particles exceeds the above described upper limit, there is a possibility that protrusions/recesses easily occur on the surface of the insulating layer 2. Here, the average particle diameter of the above described thermally decomposable resin-containing particles means a particle diameter indicating the highest content ratio in a particle diameter distribution measured with a laser diffraction particle diameter distribution measuring device.

A lower limit of the content of the thermally decomposable resin in the varnish is preferably 5 parts by mass, is more preferably 10 parts by mass, and is further preferably 15 parts by mass, with respect to 100 parts by mass of the resin forming the insulating layer 2. On the other hand, an upper limit of the content of the thermally decomposable resin in the varnish is preferably 350 parts by mass, is more preferably 150 parts by mass, and is further preferably 90 parts by mass, with respect to 100 parts by mass of the resin forming the insulating layer 2. When the content of the thermally decomposable resin is less than the above described lower limit, the formed pores 3 may not sufficiently disperse stress generated in the insulating layer 2. On the other hand, when the content of the thermally decomposable resin exceeds the above described upper limit, because the mechanical strength decreases, an occurrence of a crack in the insulating layer 2 may not be sufficiently suppressed.

As the solvent for dilution, it is possible to use a known organic solvent that is conventionally used for insulating varnish. Specific examples may include polar organic solvents such as N-methyl-2-pyrrolidone, N,N-dimethylacetamide, N,N-dimethylformamide, dimethyl sulfoxide, tetramethylurea, hexaethylphosphoric triamide, and γ-butyrolactone, ketones such as acetone, methyl ethyl ketone, methyl isobutyl ketone, and cyclohexanone, esters such as methyl acetate, ethyl acetate, butyl acetate, and diethyl oxalate, ethers such as diethyl ether, ethylene glycol dimethyl ether, diethylene glycol monomethyl ether, ethylene glycol monobutyl ether (butyl cellosolve), diethylene glycol dimethyl ether, and tetrahydrofuran, hydrocarbons such as hexane, heptane, benzene, toluene, and xylene, halogenated hydrocarbons such as dichloromethane and chlorobenzene, phenols such as cresol and chlorophenol, and tertiary amines such as pyridine, and these organic solvents are used alone or in admixture of two or more.

Note that a lower limit of a resin solid concentration of the varnish prepared by dilution with such an organic solvent is preferably 15% by mass and is more preferably 22% by mass. On the other hand, an upper limit of the resin solid concentration of the above described varnish is preferably 50% mass and is more preferably 28% by mass. When the resin solid content concentration of the above described varnish is less than the above described lower limit, the amount of coating at one time when coating the varnish decreases. Therefore, the number of repetitions of the varnish coating step for forming the insulating layer 2 having a desired thickness increases, and there is a possibility that the time for the varnish coating process increases. On the other hand, when the resin solid content concentration of the above described varnish exceeds the above described upper limit, because the varnish thickens, there is a possibility that the storage stability of the varnish is deteriorated and there is a possibility the adhesion at the time of varnish coating is deteriorated.

Although the above described thermally decomposable resin-containing particles may be particles only consisting of the above described thermally decomposable resin, the thermally decomposable resin-containing particles are preferably core-shell particles having a core containing, as a main component, the above described thermally decomposable resin and having a shell containing, as a main component, a resin having a thermal decomposition temperature that is higher than the thermal decomposition temperature of the above described thermally decomposable resin. By using such core-shell particles as the above described thermally decomposable resin-containing particles, the independent porosity of the formed pores 3 is further enhanced, and as a result, the effect of suppressing an occurrence of a crack in the insulating layer 2 is further enhanced, and the flexibility of the insulating layer 2 is further enhanced.

It is preferable that the main component resin of the shell described above has a low dielectric constant and a high heat resistance. Examples of the main component resin of the shell include polystyrene, silicone; fluorine resin, polyimide, and the like. Among these, silicone is preferable in terms of easily imparting resilience to the shell and enhancing the insulation property and the heat resistance. Here, the "fluorine resin" is a resin in which at least one of hydrogen atoms bonded to carbon atoms constituting a repeating unit of a polymer chain is substituted with a fluorine atom or an organic group having a fluorine atom (hereinafter also referred to as a "fluorine atom-containing group"). The fluorine atom-containing group is a group in which at least one of hydrogen atoms in a linear or branched organic group is substituted with a fluorine atom, and may be, for example, a group such as a fluoroalkyl group, a fluoroalkoxy group, or a fluoropolyether group. Note that a metal may be contained in a shell in a range without degrading the insulation property.

Note that as the main component resin of the shell, a resin that is of the same type as the resin that forms the insulating layer 2 described above or a different resin may be used. For example, even in a case of using, as a main component resin of a shell, a polyimide that is the same resin as the polyimide that forms the insulating layer 2 described above, because of having a thermal decomposition temperature higher than that of the above described thermally decomposable resin, even when the thermally decomposable resin is gasified, the main component resin of the shell does not easily thermally decompose, and the communication inhibition effect of the pores 3 can be obtained. For the insulated electrical cable formed of such a varnish, there may be a case in which the presence of a shell cannot be identified even when being observed with an electron microscope. On the other hand, by using, as a main component resin of a shell, a resin that is different from the resin that forms the above described insulating layer 2, the shell is not easily integrated with the above described insulating layer 2. Therefore, in comparison to a case of using a polyimide that the same resin as the polyimide that forms the insulating layer 2 described above, the communication inhibition effect of the pores 3 can be easily obtained.

Although it is not particularly limited, a lower limit of the average thickness of the shell is preferably 0.01 μm, and is more preferably 0.02 μm, for example. On the other hand, an upper limit of the average thickness of the shell is preferably 0.5 μm and is more preferably 0.4 μm. When the average thickness of the shell is less than the above described lower limit, there is a possibility that the communication inhibition effect of the pores 3 cannot be sufficiently obtained. On the other hand, when the average thickness of the shell exceeds the above described upper limit, because the volume of the pores 3 becomes too small, there is a possibility that the porosity of the insulating layer 2 cannot be increased to greater than or equal to a predetermined level. Note that the shell may be formed by one layer or may be formed by a plurality of layers. In a case where the shell is famed by a plurality of layers, the average of the total thicknesses of the plurality of layers may be within the above described thickness range.

An upper limit of the CV (coefficient of variation) value of the above described thermally decomposable resin-containing particles is preferably 30% and is more preferably 20%. In this way, by using the thermally decomposable resin-containing particles having a CV value less than or equal to the above described upper limit, it is possible to suppress a decrease in the insulation property due to a concentration of charge at a pore portion caused by a difference in pore size and a decrease in the strength of the insulating layer 2 due to a concentration of processing stress. Note that although it is not particularly limited, a lower limit of the CV value of the thermally decomposable resin-containing particles may be, for example, 1%. Here, the "CV value" means a coefficient of variation specified in JIS-Z8825 (2013).

<Varnish Coating Process>

In the above described varnish coating process, after the varnish prepared in the above described varnish preparing process is coated on the outer peripheral surface of the conductor 1, the coating amount of the varnish for the conductor 1 is adjusted and the coated varnish surface is smoothed by a coating die.

The above described coating die has an opening portion, and by the conductor 1, coated with the varnish, passing through the opening portion, the excess varnish is removed, and the coating amount of the varnish is adjusted. Thereby, the thickness of the insulating layer 2 becomes more uniform, and the mechanical strength of the insulated electrical cable is further enhanced.

<Heating Process>

Next, in the above described heating process, the conductor 1 coated with the varnish described above is caused to pass through a baking furnace to bake the varnish, to form the insulating layer 2 on the surface of the conductor 1. At the time of baking, the thermally decomposable resin of the thermally decomposable resin-containing particles contained in the varnish is gasified and removed by thermal decomposition. As a result, the pores 3 derived from the thermally decomposable resin-containing particles are formed in the insulating layer 2. In this way, the above described heating process also serves as a baking process of the varnish.

[Advantage]

In the insulated electrical cable, the insulating layer 2 containing a polyimide as a main component includes the pores 3, and the porosity of the insulating layer 2 is within the above described range. Thereby, even in a case where the insulated electrical cable is used in a high-temperature and high-humidity environment or the like and the strength such as film extension is decreased due to hydrolysis of the polyimide, which is the main component, it is possible to disperse and reduce generated stress, it is possible to effectively suppress a crack of the insulating layer, and it is possible to make the flexibility of the insulating layer excellent.

Other Embodiments

It is to be understood that embodiments disclosed herein are examples and are not restrictive in all respects. The scope of the present invention is not limited to configurations of the above described embodiments, but is indicated by claims and is intended to include all changes within the meaning and scope of equivalence with the claims.

Although a thermally decomposable resin is used to generate pores in the manufacturing method according to the embodiment described above, as long as the porosity of an insulating layer is in the above described range, instead of a thermally decomposable resin, a manufacturing method may mix a blowing agent or a thermally expandable microcapsule mixed with a varnish to form pores by the blowing agent or the thermally expandable microcapsule. For example, in the above described manufacturing method, a resin that forms an insulating layer may be diluted with a solvent to be mixed with thermally expandable microcapsules to prepare varnishes for respective pore layers and these varnishes may be coated and baked on the outer peripheral surface on a conductor to form the insulating layer. At the time of baking, the thermally expandable microcapsules contained in the varnishes expand or foam, and pores are formed by the thermally expandable microcapsules.

The thermally expandable microcapsule includes a core (inclusion) made of a thermal expanding agent, and an outer shell covering the core. The thermal expanding agent of the thermally expandable microcapsule may be any agent that expands or generates gas when being heated, according to any principle. Examples of the thermal expanding agent of the thermally expandable microcapsule include a low-melting liquid, a chemical blowing agent, and a mixture thereof.

Preferable examples of the low-melting liquid include alkanes such as butane, i-butane, n-pentane, pentane, and neopentane, freon groups such as trichlorofluoromethane, and the like. In addition, examples of the chemical blowing agent preferably include a thermally decomposable substance such as azobisisobutyronitrile that generates $N_2$ gas when being heated, or the like.

An expansion starting temperature of the thermal expanding agent of the thermally expandable microcapsule, that is, the melting point of the low-melting liquid or the thermal decomposition temperature of the chemical blowing agent, is set to be greater than or equal to a softening temperature of the outer shell of the thermally expandable microcapsule, as will be described later. More particularly, a lower limit of the expansion starting temperature of the thermal expanding agent of the thermally expandable microcapsule is preferably 60° C., and is more preferably 70° C. On the other hand, an upper limit of the expansion starting temperature of the thermal expanding agent of the thermally expandable microcapsule is preferably 200° C., and is more preferably 150° C. When the expansion starting temperature of the thermal expanding agent of the thermally expandable microcapsule is less than the above described lower limit, there is a possibility that the thermally expandable microcapsule unintentionally expands at the time of manufacturing, transporting, or storing the insulated electrical cable. On the other hand, when the expansion starting temperature of the thermal expanding agent of the thermally expandable microcapsule exceeds the above described upper limit, there is a possibility that the energy cost required to expand the thermally expandable microcapsule becomes excessively high.

On the other hand, the outer shell of the thermally expandable microcapsule is formed of an extensible material that expands without breaking at the time of expansion of the thermal expanding agent and that can form a microballoon that contains generated gas. Normally, a resin composition having, as a main component, a polymer such as a thermoplastic resin or the like, is used as the material that forms the outer shell of the thermally expandable microcapsule.

Preferable examples of the thermoplastic resin contained as the main component of the outer shell of the thermally expandable microcapsule described above include a polymer formed from monomers such as vinyl chloride, vinylidine chloride, acrylonitrile, acrylic acid, methacrylic acid, acrylate, methacrylate, or styrene, and a copolymer formed from two or more kinds of such monomers. Preferable examples of the thermoplastic resin include vinylidene chloride-acrylonitrile copolymer, and the expansion starting temperature of the thermal expanding agent in this case is greater than or equal to 80° C. and less than or equal to 150° C.

In addition, although a configuration in which the pores included in the insulating layer are formed by thermal decomposition of the thermally decomposable resin has been described in the embodiment described above, it is possible to employ a configuration in which the pores are formed by a hollow filler, for example. In a case of forming the pores by the hollow filler, for example, the insulated electrical cable can be manufactured by mixing a resin composition that forms the insulating layer with the hollow filler, and applying the mixture to a conductor by extrusion molding.

In a case of forming the pores by the hollow filler, a cavity part inside the hollow filler forms pores included in the insulating layer. Examples of the hollow filler include a silas balloon, a glass balloon, a ceramic balloon, an organic resin balloon, and the like. Among these materials, the organic resin balloon is preferable when the insulated electrical cable is required to have flexibility. In addition, among these, a glass balloon is preferable in a case where flexibility is required for the insulated electrical cable. In a case where the mechanical strength is important for an insulated electrical cable, a glass balloon is preferable because it is easily available and it is not easily damaged.

In addition, although a configuration in which the pores included in the insulating layer are formed by thermal decomposition of the thermally decomposable resin has been described in the embodiment described above, it is possible to employ a configuration in which the pores are formed by a phase separation method, for example. An example employing the phase separation method uses a thermally decomposable resin as the resin that forms the insulating layer, and uniformly mixes it mixture with a solvent, to coat the mixture in a heated and melted state on the outer peripheral surface of the conductor. Phase separation of the resin and the solvent is caused by immersion to an insoluble liquid such as water or the like, or by cooling in air atmosphere, and the pores are formed by extracting and removing the solvent using another volatile solvent.

In an insulated electrical cable according to another embodiment of the present disclosure, an additional layer, such as a primer (Primer) layer, may be provided between the conductor 1 and the insulating layer 2. The primer layer is a layer that is provided to increase adhesion between the layers, and can be formed by a known resin composition, for example.

In a case of providing a primer layer between the conductor 1 and the insulating layer 2, the resin composition forming this primer layer preferably includes one or a plurality of kinds of resins selected from polyimide, polyamide imide, polyester imide, polyester, and phenoxy resin, for example. In addition, the resin composition forming the primer layer may include an additive such as an adhesion improving agent or the like. By forming, between the conductor 1 and the insulating layer 2, the primer layer made of such a resin composition, it is possible to enhance the adhesion between the conductor and the insulating layer, and as a result, it is possible to effectively enhance properties of the insulated electrical cable such as flexibility, wear resistance, scratch resistance, processing resistance, and the like.

In addition, the resin composition forming the primer layer may include, together with the above described resin, another resin such as epoxy resin, phenoxy resin, melamine resin, or the like, for example. Also, as each of the resins included in the resin composition forming the primer layer, a commercial liquid composition (insulating varnish) may be used.

A lower limit of the average thickness of the primer layer is preferably 1 μm, and is more preferably 2 μm. On the other hand, an upper limit of the average thickness of the primer layer is preferably 30 μm, and is more preferably 20 μm. When the average thickness of the primer layer is less than the above described lower limit, the primer layer may not exhibit a sufficient adhesion with respect to the conductor. On the other hand, when the average thickness of the primer layer exceeds the above described upper limit, the diameter of the insulated electrical cable may become unnecessarily large.

In another embodiment of the present disclosure, an insulating layer may include outer shells at peripheral portions of pores. A manufacturing method of this embodiment may be, for example, as thermally decomposable resin-containing particles as described above, a method of using core shell particles or a method of using hollow filler particles ad described above. Examples of an outer shell main component include polystyrene, silicone, fluorine resin, and polyimide. Alternatively, examples of an outer shell main component include a silasu balloon, a glass balloon, a ceramic balloon, and an organic resin balloon.

EXAMPLES

In the following, although the present disclosure will be specifically described with reference to examples, the present invention is not limited to the following examples.

[Manufacturing of Insulated Electrical Cable]

An insulated electrical cable No. 1 indicated in Table was manufactured as follows. First, as a resin that forms an insulating layer, polyamic acid, which is a precursor of polyimide made from materials that are pyromellitic dianhydride and 4,4'-diaminodiphenyl ether, was synthesized. The polyamic acid was then diluted with N-methyl-2-pyrrolidone, which serves as a solvent, to prepare a varnish. Then, using this varnish, and using a vertical type coating facility, a rectangular conductor having a cross section of 2 mm×2 mm was immersed. Thereafter, it was caused to pass through a die having an opening portion having a similar shape to the conductor at a speed of 6 m/minute, and to pass through a baking furnace to perform a baking process for 1 minute at 350° C. to form an insulation coating film. This varnish application, die passing, and baking were repeated 30 times to produce an insulated electrical cable (No. 1) having a polyimide resin coating film as an insulating layer. The average thickness of the insulating layer in the insulated electrical cable No. 1 was 150 μm.

An insulated electrical cable No. 2 indicated in Table 1 was manufactured as follows. First, as a resin that forms an insulating layer, polyamic acid, which is a precursor of polyimide made from materials that are pyromellitic dianhydride and 4,4'-diaminodiphenyl ether, was synthesized. Then, the polyamic acid was diluted with N-methyl-2- pyrrolidone, which serves as a solvent, and using, as hollow forming particles, core-shell particles having a core of PMMA (polymethylmethacrylate) particles, having a shell of silicone, and having an average particle diameter of 3 µm, a varnish was prepared by dispersion by the amount such that the calculated value of the porosity of the insulating layer was 30% by volume. Using this varnish, and using a vertical type coating facility, a rectangular conductor having a cross section of 2 mm×2 mm was immersed. Thereafter, it was caused to pass through a die having an opening portion having a similar shape to the conductor at a speed of 6 m/minute, and to pass through a baking furnace to perform a baking process for 1 minute at 350° C. to form an insulation coating film. This varnish application, die passing, and baking were repeated 30 times to produce an insulated electrical cable (No. 2) having a polyimide resin coating film as an insulating layer. The average thickness of the insulating layer in the insulated electrical cable No. 2 was 150 µm.

An insulated electrical cable No. 3 indicated in Table was manufactured as follows. First, as a resin that forms an insulating layer, polyamic acid, which is a precursor of polyimide made from materials that are pyromellitic dianhydride and 4,4'-diaminodiphenyl ether, was synthesized. Then, the polyamic acid was diluted with N-methyl-2-pyrrolidone, which serves as a solvent, and using, as hollow forming particles, core-shell particles having a core of PMMA particles, having a shell of silicone, and having an average particle diameter of 3 µm, a varnish was prepared by dispersion by the amount such that the calculated value of the porosity of the insulating layer was 50% by volume. Using this varnish, and using a vertical type coating facility, a rectangular conductor having a cross section of 2 mm×2 mm was immersed. Thereafter, it was caused to pass through a die having an opening portion having a similar shape to the conductor at a speed of 6 m/minute, and to pass through a baking furnace to perform a baking process for 1 minute at 350° C. to form an insulation coating film. This varnish application, die passing, and baking were repeated 30 times to produce an insulated electrical cable (No. 3) having a polyimide resin coating film as an insulating layer. The average thickness of the insulating layer in the insulated electrical cable No. 3 was 150 µm.

[Evaluation]

With respect to each of the insulated electrical cables No. 1 to No. 3 obtained as described above, the porosity of the insulating layer, the tensile stress at the time of 10% extension of the insulating layer, and the ATF (Automatic Transmission Fluid) endurance of the insulated electrical cable were evaluated according to the following method. The evaluation results are indicated in Table 1.

(Preparation of Samples for Measurement)

The insulated electrical cable obtained as described above was extended to 107% of the unextended length (extensibility at separation: 7%) using a tensile tester (AG-IS of Shimadzu Corporation) at a tensile speed of 10 mm/minute. Thereafter, the insulated electrical cable after extension was extracted from the tensile tester, a gap is created at the interface between the conductor and the insulating layer in electrolysis in saline water to separate the conductor and the insulating layer to prepare a sample for measuring the porosity and the tensile stress of the insulating layer.

(Porosity of Insulating Layer)

A mass $W2$ of the insulating layer of the sample for measurement prepared as described above was measured. Also, an apparent volume $V1$ was obtained from an outline of the insulating layer of the sample for measurement, and a mass $W1$ for a case where no pores exist was obtained by multiplying a density $\rho1$ of a material of the insulating layer by this $V1$. From the values of these $W1$ and $W2$, the porosity was calculated by the following formula.

Porosity=$(W1-W2)\times100/W1$ (% by volume)

(Tensile Stress at 10% Extension of Insulating Layer)

With respect to the sample for measurement prepared as described above, a tensile test was conducted using a tensile tester ("AG-IS" manufactured by Shimadzu Corporation) under conditions of a tensile speed of 10 mm/min and a gauge length of 20 mm. The tensile stress at the time of 10% extension of the insulating layer was determined as the value of the tensile stress (MPa) when the rate of extension is 10% based on a stress-strain curve obtained from the tensile test described above.

(ATF endurance Test of Insulated Electrical Cable)

In order to evaluate the property of suppressing an occurrence of a crack of the insulating layer of the insulated electrical cable obtained above, under high temperature and sealed conditions as conditions for reproducing hydrolysis of polyimide that may occur in a high temperature and high humidity environment, an ATF endurance test was conducted at a temperature of 150° C. for respective times of 100 hours, 250 hours, and 500 hours. The ATF endurance test was performed according to the following procedure. 100 cc of ATF was put into a sealed container for autoclave having a diameter of 30 mm and a container capacity of 250 $cm^3$, and the insulated electrical cable in a state of being extended by 10% was immersed therein and sealed. Thereafter, it was heated in a constant temperature bath of 150° C. and the pressure in the container of 150° C. was set to at 1.8 atm, to be maintained for the above described measured time. The property of suppressing a crack occurrence was evaluated by visually checking the presence or absence of a crack in the insulating layer at each measurement time. In Table 1, "-" indicates that the evaluation was not performed in the subsequent time because an occurrence of a crack was identified.

TABLE 1

| INSULATED ELECTRICAL CABLE | | No. 1 | No. 2 | No. 3 |
|---|---|---|---|---|
| POROSITY OF INSULATING LAYER (% BY VOLUME) | | 0 | 30 | 50 |
| TENSILE STRESS AT TIME OF 10% EXTENSION OF INSULATING LAYER (MPa) | | 130 | 70 | 50 |
| ATF ENDURANCE TEST OF INSULATED ELECTRICAL CABLE | 100 h | WITH CRACK | NO CRACK | NO CRACK |
| | 250 h | — | NO CRACK | NO CRACK |
| | 500 h | — | NO CRACK | NO CRACK |

From the results indicated in Table 1, for the insulated electrical cables No. 2 and No. 3 in which the porosity of the insulating layer is within the above described range, it can be seen that the tensile stress at the time of 10% extension of the insulating layer is less than or equal to a predetermined value, that no cracks were observed for 500 hours in the ATF endurance test, that an occurrence of a crack in the insulating layer was effectively suppressed, and that the flexibility of the insulating layer was excellent. On the other hand, the porosity in the insulating layer of the insulated electrical cable No. 1 was outside the above described range, and a crack was observed in the ATF endurance test, and the flexibility of the insulating layer was insufficient.

DESCRIPTION OF THE REFERENCE NUMERALS

1: Conductor
2: Insulating Layer
3: Pore

The invention claimed is:

1. An insulated electrical cable comprising:

a conductor; and an insulating layer that is laminated on an outer peripheral surface the conductor and includes a polyimide as a main component, wherein the insulating layer includes a plurality of pores, wherein a porosity of the insulating layer is greater than or equal to 25% by volume and less than or equal to 60% by volume, and wherein a coefficient of variation or the pores is less than or equal to 30%.

2. The insulated electrical cable according to claim 1, wherein a tensile stress at a time of 10% extension of the insulating layer is less than or equal to 100 MPa.

3. The insulated electrical cable according to claim 1, wherein an average thickness of the insulating layer is greater than or equal to 10 μm.

4. The insulated electrical cable according to claim 1, wherein the polyimide is a condensation polymer of an aromatic tetracarboxylic dianhydride and an aromatic diamine.

5. The insulated electrical cable according to claim 1, further comprising a primer layer between the conductor and the insulating layer.

6. The insulated electrical cable according to claim 1, wherein the insulating layer includes a plurality of pores and an outer shell at a peripheral portion of the pores.

* * * * *